United States Patent
Hong

(10) Patent No.: US 10,829,830 B2
(45) Date of Patent: Nov. 10, 2020

(54) PRESSURE VESSEL STEEL PLATE HAVING EXCELLENT POST WELD HEAT TREATMENT RESISTANCE, AND MANUFACTURING METHOD THEREFOR

(71) Applicant: POSCO, Pohang-si (KR)

(72) Inventor: Soon-Taik Hong, Pohang-si (KR)

(73) Assignee: POSCO, Gyeongsangbuk-do (KR)

( * ) Notice: Subject to any disclaimer, the term of this patent is extended or adjusted under 35 U.S.C. 154(b) by 268 days.

(21) Appl. No.: 16/061,840

(22) PCT Filed: Nov. 3, 2016

(86) PCT No.: PCT/KR2016/012562
§ 371 (c)(1),
(2) Date: Jun. 13, 2018

(87) PCT Pub. No.: WO2017/104969
PCT Pub. Date: Jun. 22, 2017

(65) Prior Publication Data
US 2018/0371567 A1    Dec. 27, 2018

(30) Foreign Application Priority Data
Dec. 17, 2015 (KR) .......................... 10-2015-0181285

(51) Int. Cl.
| | |
|---|---|
| *C21D 8/02* | (2006.01) |
| *C22C 38/42* | (2006.01) |
| *C22C 38/44* | (2006.01) |
| *C22C 38/46* | (2006.01) |
| *C22C 38/48* | (2006.01) |
| *C22C 38/52* | (2006.01) |
| *C21D 6/00* | (2006.01) |
| *C22C 38/02* | (2006.01) |
| *C22C 38/04* | (2006.01) |
| *C22C 38/06* | (2006.01) |
| *C21D 9/46* | (2006.01) |

(52) U.S. Cl.
CPC .......... *C21D 8/0263* (2013.01); *C21D 6/004* (2013.01); *C21D 6/005* (2013.01); *C21D 6/007* (2013.01); *C21D 6/008* (2013.01); *C21D 8/02* (2013.01); *C21D 8/0226* (2013.01); *C21D 8/0273* (2013.01); *C21D 9/46* (2013.01); *C22C 38/02* (2013.01); *C22C 38/04* (2013.01); *C22C 38/06* (2013.01); *C22C 38/42* (2013.01); *C22C 38/44* (2013.01); *C22C 38/46* (2013.01); *C22C 38/48* (2013.01); *C22C 38/52* (2013.01); *C21D 2211/002* (2013.01); *C21D 2211/008* (2013.01)

(58) Field of Classification Search
CPC ...... C21D 8/0263; C21D 6/004; C21D 6/005; C21D 6/007; C21D 6/008; C21D 8/02; C21D 8/0226; C21D 8/0273; C21D 9/46; C21D 2211/002; C21D 2211/008; C22C 38/02; C22C 38/04; C22C 38/06; C22C 38/42; C22C 38/44; C22C 38/46; C22C 38/48; C22C 38/52
See application file for complete search history.

(56) References Cited

U.S. PATENT DOCUMENTS

| | | | |
|---|---|---|---|
| 2008/0283158 A1 | 11/2008 | Nagao et al. | |
| 2011/0259481 A1* | 10/2011 | Hong | ............... C22C 38/001 |
| | | | 148/564 |
| 2012/0199255 A1* | 8/2012 | Anelli | ............... C22C 38/04 |
| | | | 148/593 |
| 2015/0047749 A1* | 2/2015 | Hirata | ............... C22C 38/001 |
| | | | 148/330 |

FOREIGN PATENT DOCUMENTS

| | | |
|---|---|---|
| CN | 104781436 A | 7/2015 |
| EP | 2918694 A1 | 9/2015 |
| JP | S59-153866 A | 9/1984 |
| JP | H08-104943 A | 4/1996 |
| JP | H10-017982 A | 1/1998 |
| JP | H11-131177 A | 5/1999 |
| JP | 2000-345281 A | 12/2000 |
| JP | 2006-045672 A | 2/2006 |

(Continued)

OTHER PUBLICATIONS

ASTM International. E562-08 Standard Test Method for Determining Volume Fraction by Systematic Manual Point Count. West Conshohocken, PA; ASTM International, 2008. (Year: 2008).*

(Continued)

*Primary Examiner* — Anthony J Zimmer
*Assistant Examiner* — Ricardo D Morales
(74) *Attorney, Agent, or Firm* — Morgan, Lewis & Bockius LLP

(57) ABSTRACT

The present disclosure relates to a middle high temperature pressure vessel steel plate having excellent resistance against a post weld heat treatment (PWHT) and a manufacturing method therefor. The pressure vessel steel plate includes 0.05 to 0.17 wt % of C, 0.50 to 1.00 wt % of Si, 0.3 to 0.8 wt % of Mn, 1.0 to 1.5 wt % of Cr, 0.3 to 1.0 wt % of Mo, 0.003 to 0.30 wt % of Ni, 0.003 to 0.30 wt % of Cu, 0.005 to 0.06 wt % of Sol.Al, 0.015 wt % or less of P, and 0.020 wt % or less of S; additionally two or more elements selected from 0.002 to 0.025 wt % of Nb, 0.002 to 0.03 wt % of V, and 0.002 to 0.15 wt % of Co; and Fe and unavoidable impurities as the reminder, wherein a microstructure of a central portion of the steel plate is formed in a mixed structure of 20 area % or more of tempered martensite and the residue bainite.

10 Claims, No Drawings

(56) References Cited

FOREIGN PATENT DOCUMENTS

| | | |
|---|---|---|
| JP | 2007-119889 A | 5/2007 |
| JP | 2011-001620 A | 1/2011 |
| JP | 2012-122111 A | 6/2012 |
| JP | 2012-172203 A | 9/2012 |
| JP | 2013-144842 A | 7/2013 |
| JP | 2014095130 A | 5/2014 |
| JP | 2014-201815 A | 10/2014 |
| KR | 10-0833071 B1 | 5/2008 |
| KR | 10-2011-0060449 A | 6/2011 |
| KR | 10-2012-0067150 A | 6/2012 |
| KR | 10-2012-0073448 A | 7/2012 |
| KR | 10-2015-0074952 A | 7/2015 |

OTHER PUBLICATIONS

International Search Report dated Feb. 2, 2017 issued in International Patent Application No. PCT/KR2016/012562 (with English translation).
Japanese Office Action dated Jul. 9, 2019 issued in Japanese Patent Application No. 2018-530843.
Chinese Office Action dated Aug. 14, 2019 issued in Chinese Patent Application No. 201680074703.6 (with English translation).
Extended European Search Report dated Aug. 28, 2018 issued in European Patent Application No. 16875911.6.

* cited by examiner

PRESSURE VESSEL STEEL PLATE HAVING EXCELLENT POST WELD HEAT TREATMENT RESISTANCE, AND MANUFACTURING METHOD THEREFOR

CROSS REFERENCE

This patent application is the U.S. National Phase under 35 U.S.C. § 371 of International Application No. PCT/KR2016/012562, filed on Nov. 3, 2016, which claims the benefit of Korean Patent Application No. 10-2015-0181285, filed on Dec. 17, 2015, the entire contents of each are hereby incorporated by reference.

TECHNICAL FIELD

The present disclosure relates to a steel plate for a pressure vessel such as a boiler, a pressure vessel, or the like of a power plant, of a middle-high temperature of 350 to 600° C., and more particularly, to a steel plate having excellent strength and toughness even after a post weld heat treatment (PWHT) is performed, and a manufacturing method therefor.

BACKGROUND ART

According to a recent trend for oilfields in poor surroundings to be actively developed, due to the era of high oil prices as well as petroleum in being in recent short supply, the thickness of steel vessels for refining and storing crude oil is being increased.
A Post Weld Heat Treatment (PWHT) is carried out to eliminate stress generated during welding with the objects of stabilizing shape and size and preventing the deformation of a structure after welding if the steel is welded in addition to the above-mentioned thickening of steel. However, a steel sheet passing through the PWHT process for a lengthy period of time may have a problem in that tensile strength of the steel sheet may be deteriorated due to coarsening of the structure of the steel sheet.

That is, a lengthy PWHT process may cause a phenomenon in which strength and toughness of the steel sheet are lowered at the same time, depending on softening of matrix structures and crystal grain boundaries, growth of crystal grains, coarsening of carbides, and others.

The conventional manufacturing method disclosed in Korean Patent Laid-Open Publication No. 2012-0073448 uses a method of applying a tempering heat treatment pattern utilizing a thick steel plate material consisting of 0.13 to 0.15 wt % of C, 0.20 to 0.65 wt % of Si, 0.4 to 0.6 wt % of Mn, 1.3 to 2.3 wt % of Cr, 0.6 to 1.1 wt % of Mo, 0.1 to 0.2 wt % of Ni, 0.1 to 0.2 wt % of Cu, 0.2 to 0.6 wt % of Sol.Al, 0.008 wt % or less of P, and 0.020 wt % of S, that is, utilizing a reduction in strength according to a reduction potential density during high temperature tempering in an eduction enhancement effect generated by a low temperature tempering by performing a low temperature heat treatment after a high temperature heat treatment, but such a method also has a disadvantage in that resistance may be significantly deteriorated after the lengthy PWHT process.

RELATED ART DOCUMENT (Patent Document 1) Korean Patent Laid-Open Publication No. 2012-0073448

DISCLOSURE

Technical Problem

An aspect of the present disclosure is to provide a high strength steel sheet having excellent resistance and toughness against a Post Weld Heat Treatment (PWHT) of which strength and toughness are not deteriorated even after performing the PWHT for a lengthy period of time, and a method for manufacturing the same.

Technical Solution

According to an aspect of the present disclosure, a pressure vessel steel plate having excellent resistant against a post weld heat treatment (PWHT) includes 0.05 to 0.17 wt % of C, 0.50 to 1.00 wt % of Si, 0.3 to 0.8 wt % of Mn, 1.0 to 1.5 wt % of Cr, 0.3 to 1.0 wt % of Mo, 0.003 to 0.30 wt % of Ni, 0.003 to 0.30 wt % of Cu, 0.005 to 0.06 wt % of Sol.Al, 0.015 wt % or less of P, and 0.020 wt % or less of S; additionally two or more elements selected from 0.002 to 0.025 wt % of Nb, 0.002 to 0.03 wt % of V, and 0.002 to 0.15 wt % of Co; and Fe and unavoidable impurities as the reminder, wherein a microstructure of a central portion of the steel plate is formed as a mixed structure of 20 area % or more of tempered martensite and the residue bainite.

The steel plate may hold tensile strength of 550 MPa or more even when the PWHT is performed for up to 50 hours in the range of 600 to $(Ac1-20)°$ C., wherein $Ac1(° C.)=723+29.1*Si-10.7*Mn-16.9*Ni+16.9*Cr+6.38*W+290*As$, and each alloy element has a value denoting the content thereof in wt %.

The steel plate has a Charpy impact energy value of 100 J or more, more preferably, 200 J or more at −30° C., even when the PWHT is performed for up to 50 hours in the range of 600 to $(Ac1-20)$ ° C.

According to another aspect of the present disclosure, a manufacturing method of a pressure vessel steel plate having excellent resistant against a post weld heat treatment (PWHT) includes reheating and hot rolling a steel slab including 0.05 to 0.17 wt % of C, 0.50 to 1.00 wt % of Si, 0.3 to 0.8 wt % of Mn, 1.0 to 1.5 wt % of Cr, 0.3 to 1.0 wt % of Mo, 0.003 to 0.30 wt % of Ni, 0.003 to 0.30 wt % of Cu, 0.005 to 0.06 wt % of Sol.Al, 0.015 wt % or less of P, and 0.020 wt % or less of S; additionally two or more elements selected from 0.002 to 0.025 wt % of Nb, 0.002 to 0.03 wt % of V, and 0.002 to 0.15 wt % of Co; and Fe and unavoidable impurities as the reminder in the temperature range of 1000 to 1250° C.; a primary heat treatment operation in which the hot rolled steel plate is held for a time of $\{1.3 \times t+(10 \text{ to } 30)\}$ (min) (wherein, t is thickness (mm) of steel) in the temperature range of 850 to 950° C.; and a tempering heat treatment operation in which the heat treated steel plate is cooled and is held for a time of $\{1.6 \times t+(10 \text{ to } 30)\}$ (min) (wherein, t is thickness (mm) of steel) in the temperature range of 600 to Ac1° C.

The manufacturing method may further include, after the tempering heat treatment operation, a process of performing the PWHT for up to 50 hours in the range of 600 to (Ac1−20°) C.

After the tempering heat treatment operation, a microstructure of the steel plate may be formed as a mixed structure of 20 area % or more of tempered martensite and the residue bainite, and more preferably, may be formed as a mixed structure of 20 to 80 area % or more of tempered martensite and the residue bainite.

Advantageous Effects

As set forth above, according to an exemplary embodiment in the present disclosure, the pressure vessel steel plate of which strength and toughness are not deteriorated, even after performing PWHT for a lengthy period of time, may be provided.

BEST MODE FOR INVENTION

Hereinafter, exemplary embodiments in the present disclosure will be described in detail.

The present disclosure relates to a middle-high temperature pressure vessel steel plate used for structural steel in a power generation and electrical plant industry, and a manufacturing method therefor, and more particularly, to a middle-high temperature pressure vessel steel plate having significantly improved resistance against deterioration of strength and toughness even after performing a Post Weld Heat Treatment (PWHT) carried out to significantly reduce residual stress generated by a welding during the manufacturing for a lengthy period of time, and a manufacturing method therefor.

The middle-high temperature pressure vessel steel plate according to the present disclosure may be applied to a middle-high temperature pressure vessel steel plate, or the like of about 350-600° C., such as a boiler, a pressure vessel, and the like of a power plant having excellent resistance against PWHT of which strength and toughness are not deteriorated even though the PWHT is performed for a lengthy period of time.

First, a composition range of the present disclosure (hereinafter referred to as "weight percent (wt %)") is described in detail.

The content of carbon (C) may be limited to a range of 0.05 to 0.17 wt %. C, as an element for improving strength of a steel sheet, has problems in that the strength of the steel sheet in a matrix phase is lowered with a C content of less than 0.05 wt %, and toughness is lowered due to an excessive increase of strength with a C content of more than 0.17 wt %.

The content of silicon (Si) may be limited to a range of 0.50 to 1.00 wt %. Si is an element that is effective in deoxidation and solid solution strengthening, and is an element that achieves an effect of increasing the impact transition temperature. Although Si should be added in an amount of 0.50 wt % or more to accomplish target strength, there are problems that weldability may be deteriorated, and impact toughness may be deteriorated if Si is added in an amount greater than 1.00 wt %.

The content of manganese (Mn) may be limited to a range of 0.3 to 0.8 wt %. Mn may be preferably controlled to the content of 0.8 wt % or less since Mn, along with S, forms MnS, an elongated nonmetallic inclusion, thereby deteriorating elongation at room temperature and low temperature toughness. However, the content of Mn may be limited to being within the range of 0.3 to 0.8 wt % since it is difficult to secure proper strength due to the nature of the present disclosure if Mn is added to the content of less than 0.3 wt %.

The content of aluminum (Al) may be limited to a range of 0.005 to 0.06 wt %. Al, together with the above-mentioned Si, is one of strong deoxidizers in the steelmaking process, and has problems that the deoxidation effect is insignificant with an Al content of less than 0.005 wt %, and the deoxidation effect is saturated and manufacturing costs increase if Al is added in an amount greater than 0.06 wt %.

The content of chromium (Cr) may be limited to a range of 1.0 to 1.5 wt %. Although Cr is added in an amount of 1.0 wt % or more to obtain the strength increasing effect in the present disclosure since chromium (Cr) is an element that increases high temperature strength, it may be advantageous to control chromium (Cr) to the amount of 1.5 wt % or less since chromium (Cr) is a relatively expensive element, and chromium (Cr) causes manufacturing costs to be increased if chromium (Cr) is added in an amount greater than 1.5 wt %.

The content of molybdenum (Mo) may be limited to a range of 0.3 to 1.0 wt %. Mo is an element that prevents cracking of the steel plate due to sulfides as well as an element that is effective in increasing high temperature strength of the steel plate as in the case of Cr. Although Mo is added to the amount of 0.3 wt % or more to obtain the effects, it may be advantageous to limit the amount of Mo to 1.0 wt % or less since Mo is also a relatively expensive element and causes manufacturing costs to increase.

The content of copper (Cu) may be limited to a range of 0.003 to 0.30 wt %. Cu is an element that is effective in increasing strength of the steel plate. Therefore, an effect of increasing strength may be achieved even when Cu should be added to the amount of 0.003 wt % or more, Cu may be added to the content of less than 0.30 wt % since it is an expensive element.

The content of nickel (Ni) may be limited to a range of 0.003 to 0.30 wt %. It may be advantageous to add Ni in an amount of 0.30 wt % or less since Ni is a relatively expensive element and causes manufacturing costs to increase even in the case that Ni is added in an amount of 0.003 wt % or more to obtain the effect as an element that is most effective in improving low temperature toughness of the steel plate.

P, as an element that deteriorates low temperature toughness and increases temper embrittlement sensitivity, should have a content that is controlled to be low, but P is added to the contents of 0.015 wt % or less, since it is difficult to perform a process for lowering the content of P and production costs may be increased due to additional processes.

Since S, as an element reducing low temperature toughness as in a case of P, forms an MnS inclusion among the steel and deteriorates toughness of the steel, the content of S should be controlled to be low, but S may be added to the content of 0.020 wt % or less since it is difficult to remove S and additional production costs are excessively spent.

The foregoing composition of the present disclosure may include two or more elements selected from the group consisting of 0.002 to 0.025 wt % of Nb, 0.002 to 0.03 wt % of V, and 0.002 to 0.15 wt % of Co.

Niobium (Nb) may be added to the content of the range of 0.002 to 0.025 wt %. Nb is an element that is effective in preventing a matrix structure from softening by forming fine carbides or nitrides, but may be added to the content within the range 0.002 to 0.025 wt % since it is expensive.

Vanadium (V) may be added to the content of the range of 0.002 to 0.03 wt %. Since V is also an element that may easily form fine carbide and nitride as in a case of Nb and is expensive, V may be added to the content within the range of 0.002 to 0.03 wt %.

Cobalt (Co), as an element that has an effect of preventing the matrix structure from softening and delaying recovery of potential, may be added to the content within the range of 0.002 to 0.15 wt %.

The composition includes Fe as well as unavoidable impurities as a remainder.

Hereinafter, the microstructure of the present disclosure will be described in detail.

If steel having the above-mentioned composition is subjected to controlled rolling and heat treatment by a process to be described later, the microstructure of a central portion of the steel plate may be formed as a mixed structure of tempered martensite and bainite, and the structure should contain at least 20% or more (the remainder is tempered bainite) of an area fraction of the tempered martensite structure. In addition, fine MX[(M=Al, Nb, V, Cr, Mo), (X=N, C)] type carbides of 80 nm or less may be formed within an internal structure of the steel in which the heat treatment is completed, that is, a crystal grain. The reason to control the structure to the above-mentioned form is to allow the steel plate to have excellent resistance against PWHT and appropriate strength and toughness that are targeted by the present disclosure.

Hereinafter, a manufacturing method according to the present disclosure will be described in detail.

The manufacturing method according to the present disclosure may include reheating a steel slab satisfying the above-mentioned composition range to a temperature range of 1000 to 1250° C. Here, a solid solution of solute atoms is difficult if the reheating temperature is lower than 1000° C., and sizes of austenite crystal grains become too coarse to deteriorate properties of the steel plate if the reheating temperature is more than 1250° C.

Thereafter, the steel slab heated as described above may be hot rolled, and a cooled hot rolled steel plate may be heat treated.

During the hot rolling, a reduction ratio per pass is not particularly limited, and may be 5 to 30%.

The heat treatment may be performed while being held for a time of {1.3×t+(10 to 30)} (min) [but, t is thickness (mm) of steel] in the temperature range of 850 to 950° C.

Since it is difficult to resolve solute atoms for solid solution if the heat treatment is conducted at a temperature of less than 850° C., it is difficult to secure strength, whereas low temperature toughness of the steel sheet is deteriorated since crystal grains are grown if the heat treatment is conducted at a temperature of more than 950° C.

The heat treatment holding time is limited since homogenization of the structure is difficult if the holding time is less than (1.3×t+10) (min) (t is thickness (mm) of steel), and productivity is deteriorated if the holding time is more than 1.3×t+30) (min) (t is thickness (mm) of steel).

The steel plate held under the temperature and time conditions may be cooled at 2.5 to 30° C./sec based on a cooling speed of a central portion. If the cooling speed is 2.5° C./sec or less, coarse ferrite crystal grains may occur during the cooling, and if the cooling speed is more than 30° C./sec, it is disadvantageous in terms of economy due to excessive cooling facilities.

A tempering heat treatment operation in which the heat treated and cooled steel plate is held for a time of {1.6×t+(10 to 30)} (min) (but, t is thickness (mm) of steel) in the temperature range of 600 to Ac1° C. may be performed.

Since it is difficult to precipitate a fine precipitate if the tempering heat treatment is conducted at a temperature of less than 600° C., it is difficult to secure strength, whereas strength and low temperature toughness of the steel sheet are deteriorated since precipitate is grown if the heat treatment is conducted at a temperature of more than Ac1° C.

The heat treatment holding time is limited since homogenization of the structure is difficult if the holding time is less than 1.6×t+10 (min) (t is thickness (mm) of steel), and productivity is deteriorated if the holding time is more than 1.6×t+10 (min) (t is thickness (mm) of steel).

When a pressure vessel is manufactured using the steel plate according to the present disclosure manufactured through the tempering heat treatment process in which the heat treated steel plate is cooled at the cooling speed of 2.5 to 30° C./sec and is held for the time of {1.6×t+(10~30)} (min) (but, t is thickness (mm) of steel) in the temperature range of 600° C. to Ac1° C., a PWHT treatment for the removal of residual stress added by a welding process may be conducted.

Although strength and toughness of the steel plate are generally deteriorated after performing PWHT on a steel plate for a lengthy period of time, the steel plate manufactured by the present disclosure has a merit in that welding work is possible without a large reduction in strength and toughness of the steel plate even when the steel plate is subjected to PWHT at an ordinary PWHT temperature of 600° C. to (Ac1−20°) C. for a lengthy period of time of up to 50 hours.

The steel plate according to an exemplary embodiment in the present disclosure may have a tensile strength of 550 MPa or more even after performing PWHT for 50 hours, and satisfies a Charpy impact energy value of 100 J or more at −30° C., thereby having excellent strength and toughness.

Hereinafter, exemplary embodiments in the present disclosure will be described in detail. However, the present disclosure is not limited to the following exemplary embodiments.

The following table 1 exhibits chemical components of inventive steels and comparative steels, respectively.

Hot rolled steel plates having thicknesses shown in the following Table 2 are manufactured by heating a steel slab having compositions as shown in the following Table 1 for 300 minutes at 1140° C., hot rolling the steel slab at a reduction ratio of 15%, and ending the hot rolling at 950° C. The hot rolled hot steel plate was primarily heat treated by holding it for a time {1.3×t+(10 to 30)} (min) (but, t is thickness (mm) of steel) at 930° C., and the primarily heat treated steel plate was then cooled at a cooling speed of 3 to 20° C./sec and was tempered and PWHT treated under the conditions of the following Table 2.

As described above, microstructures, yield strengths, tensile strengths, and low temperature toughness of the PWHT treated steel plates were examined, and results thereof are shown in the following Table 3.

The low temperature toughness values in the following Table 3 were evaluated as Charpy impact energy values obtained by performing the Charpy impact test of samples having V notches at −30° C.

TABLE 1

|  | C | Mn | Si | P | S | Sol. Al | Ni | Cr | Mo | Cu | Nb | V |
|---|---|---|---|---|---|---|---|---|---|---|---|---|
| Inventive Steel A | 0.14 | 0.59 | 0.59 | 0.005 | 0.0011 | 0.028 | 0.13 | 1.35 | 0.60 | 0.10 | 0.0018 | — |
| Inventive Steel B | 0.13 | 0.55 | 0.62 | 0.006 | 0.0013 | 0.031 | 0.17 | 1.29 | 0.63 | 0.13 | — | 0.008 |

TABLE 1-continued

| | C | Mn | Si | P | S | Sol. Al | Ni | Cr | Mo | Cu | Nb | V |
|---|---|---|---|---|---|---|---|---|---|---|---|---|
| Inventive Steel C | 0.13 | 0.60 | 0.65 | 0.008 | 0.0015 | 0.030 | 0.14 | 1.30 | 0.65 | 0.12 | 0.020 | 0.010 |
| Comparative Steel D | 0.14 | 0.56 | 0.58 | 0.008 | 0.0012 | 0.033 | 0.15 | 1.32 | 0.60 | 0.13 | — | — |

TABLE 2

| | | Heat Treatment Conditions | | | | | |
|---|---|---|---|---|---|---|---|
| Classification | Thickness of Steel Plate (mm) | Primary Heat Treatment Temperature (° C.) | Primary Heat Treatment Time (min) | Tempering Temperature (° C.) | Tempering Time (min) | PWHT temperature (° C.) | PWHT time (hours) |
| Inventive Steel A | 50 | 930 | 85 | 730 | 100 | 710 | 15 |
| | 100 | 930 | 150 | 730 | 180 | 710 | 30 |
| | 150 | 930 | 215 | 730 | 260 | 710 | 50 |
| Inventive Steel B | 50 | 930 | 85 | 730 | 100 | 710 | 15 |
| | 100 | 930 | 150 | 730 | 180 | 710 | 30 |
| | 150 | 930 | 215 | 730 | 260 | 710 | 50 |
| Inventive Steel C | 50 | 930 | 85 | 730 | 100 | 710 | 15 |
| | 100 | 930 | 150 | 730 | 180 | 710 | 30 |
| | 150 | 930 | 215 | 730 | 260 | 710 | 50 |
| Comparative Steel D | 50 | 930 | 85 | 730 | 100 | 710 | 15 |
| | 100 | 930 | 150 | 730 | 180 | 710 | 30 |
| | 150 | 930 | 215 | 730 | 260 | 710 | 50 |

TABLE 3

| | | Physical Properties | | | |
|---|---|---|---|---|---|
| Classification | Thickness of Steel Plate mm) | Area Fraction (%) of Tempered Martensite | YS (MPa) | TS (MPa) | EL (%) | CVN @ −30° C. (J) |
| Inventive Steel A | 50 | 41 | 498 | 652 | 30 | 312 |
| | 100 | 36 | 482 | 642 | 31 | 323 |
| | 150 | 27 | 480 | 636 | 32 | 329 |
| Inventive Steel B | 50 | 38 | 487 | 645 | 32 | 319 |
| | 100 | 32 | 494 | 639 | 34 | 306 |
| | 150 | 26 | 507 | 627 | 33 | 318 |
| Inventive Steel C | 50 | 45 | 596 | 634 | 32 | 318 |
| | 100 | 37 | 582 | 628 | 33 | 326 |
| | 150 | 28 | 553 | 619 | 35 | 318 |
| Comparative Steel D | 50 | 18 | 401 | 521 | 30 | 125 |
| | 100 | 15 | 395 | 513 | 32 | 45 |
| | 150 | 12 | 394 | 509 | 33 | 38 |

As may be seen from the results of tables 1, 2, and 3, inventive steels satisfying compositions and manufacturing conditions of the present disclosure have strength and toughness values that are not lowered although the PWHT time reaches 50 hours. On the contrary, it may be confirmed that the comparative steels are out of compositions of the present disclosure and strength and toughness values thereof are substantially deteriorated than those of the inventive steels even under the same PWHT conditions.

In particular, it may be seen that low temperature toughness values of the inventive steels were not reduced greatly even after the PWHT time of 50 hours, whereas strengths of the comparative steels were reduced by about 100 MPa and the low temperature toughness values thereof are reduced by about 250 J or more.

The invention claimed is:

1. A pressure vessel steel plate having excellent resistant against a post weld heat treatment (PWHT), the pressure vessel steel plate comprising 0.05 to 0.17 wt % of C, 0.59 to 1.00 wt % of Si, 0.3 to 0.8 wt % of Mn, 1.0 to 1.5 wt % of Cr, 0.3 to 1.0 wt of Mo, 0.003 to 0.30 wt % of Ni, 0.003 to 0.30 wt % of Cu, 0.005 to 0.06 wt % of Sol.Al, 0.015 wt % or less of P, and 0.020 wt % or less of S; additionally two or more elements selected from 0.002 to 0.025 wt % of Nb, 0.002 to 0.03 wt % of V, and 0.002 to 0.15 wt % of Co; and Fe and unavoidable impurities as the reminder,
wherein a microstructure of a central portion of the steel plate is formed as a mixed structure of 20 area % or more of tempered martensite and the residue bainite and wherein the steel plate has a thickness of 50 mm to 150 mm.

2. The pressure vessel steel plate of claim 1, wherein the steel plate holds tensile strength of 550 MPa or more even when the PWHT is performed for up to 50 hours in the range of 600 to (Ac1-20) ° C.

3. The pressure vessel steel plate of claim 1, wherein the steel plate has Charpy impact energy value of 100 J or more at −30° C. even when the PWHT is performed for up to 50 hours in the range of 600 to (Ac1-20)° C.

4. A manufacturing method of a pressure vessel steel plate having excellent resistant against a post weld heat treatment (PWHT), the manufacturing method comprising:
reheating and hot rolling a steel slab including 0.05 to 0.17 wt % of C, 0.59 to 1.00 wt % of Si, 0.3 to 0.8 wt % of Mn, 1.0 to 1.5 wt % of Cr, 0.3 to 1.0 wt % of Mo, 0.003 to 0.30 wt % of Ni, 0.003 to 0.30 wt % of Cu, 0.005 to 0.06 wt % of Sol.Al, 0.015 wt % or less of P, and 0.020 wt % or less of S; additionally two or more elements selected from 0.002 to 0.025 wt % of Nb, 0.002 to 0.03 wt % of V, and 0.002 to 0.15 wt % of Co; and Fe and unavoidable impurities as the reminder in the temperature range of 1000 to 1250° C.;

a primary heat treatment operation in which the hot rolled steel plate is held for a time of {1.3.times.t+(10 to 30)} (min) (wherein, t is thickness (mm) of steel) in the temperature range of 850 to 950° C.; and a tempering heat treatment operation in which the heat treated steel plate is maintained for a time of {1.6×t+(10 to 30)} (min) (wherein t is thickness (mm) of steel) at a temperature in a temperature range of 600° C. to the Ac1 point after the heat treated steel plate is cooled to martensite and bainite formation temperature ranges, and wherein the steel plate has a thickness of 50 mm to 150 mm.

5. The manufacturing method of claim 4, further comprising, after the tempering heat treatment operation, a process of performing the PWHT for up to 50 hours in the range of 600 to (Ac1-20) ° C.

6. The manufacturing method of claim 4, wherein after the tempering heat treatment operation, a microstructure of the steel plate is formed as a mixed structure of 20 area % or more of tempered martensite and the residue bainite.

7. The manufacturing method of claim 4, wherein in the hot rolling of the steel slab, a reduction ratio per pass is 5 to 30%.

8. The manufacturing method of claim 4, wherein in the cooling of the steel plate, a cooling speed is 2.5 to 30° C./sec.

9. The manufacturing method of claim 4, wherein the steel plate after the tempering heat treatment operation holds tensile strength of 550 MPa or more even when the PWHT is performed for up to 50 hours in the range of 600 to (Ac1-20) ° C.

10. The manufacturing method of claim 4, wherein the steel plate after the tempering heat treatment operation has Charpy impact energy value of 100 J or more at −30° C. even when the PWHT is performed for up to 50 hours in the range of 600 to (Ac1-20) ° C.

* * * * *